(12) United States Patent
Pourtaud et al.

(10) Patent No.: US 10,888,828 B2
(45) Date of Patent: Jan. 12, 2021

(54) DEVICE FOR ADJUSTING THE CONCENTRATION OF GAS IN A LIQUID

(71) Applicants: Nicolas Pourtaud, Fabregues (FR); Francois Rigail, Beaulieu (FR)

(72) Inventors: Nicolas Pourtaud, Fabregues (FR); Francois Rigail, Beaulieu (FR)

( * ) Notice: Subject to any disclaimer, the term of this patent is extended or adjusted under 35 U.S.C. 154(b) by 458 days.

(21) Appl. No.: 15/577,891

(22) PCT Filed: May 27, 2016

(86) PCT No.: PCT/FR2016/051259
§ 371 (c)(1),
(2) Date: Dec. 19, 2017

(87) PCT Pub. No.: WO2016/193586
PCT Pub. Date: Dec. 8, 2016

(65) Prior Publication Data
US 2018/0169596 A1    Jun. 21, 2018

(30) Foreign Application Priority Data
May 29, 2015    (FR) ..................... 15 54843

(51) Int. Cl.
  *B01F 15/00*    (2006.01)
  *B01F 15/04*    (2006.01)
  (Continued)

(52) U.S. Cl.
  CPC ...... *B01F 15/0022* (2013.01); *B01F 3/04468* (2013.01); *B01F 5/0476* (2013.01);
  (Continued)

(58) Field of Classification Search
  CPC .............. B01F 3/04468; B01F 3/04503; B01F 3/04439; B01F 3/04815; B01F 5/0476;
  (Continued)

(56) References Cited

U.S. PATENT DOCUMENTS

2002/0144727 A1* 10/2002 Kashkoush .......... G05D 11/138
                                                                      137/93
2003/0234030 A1* 12/2003 Shibayama ........ B01D 19/0031
                                                                      134/2
(Continued)

FOREIGN PATENT DOCUMENTS

FR          2 656 546 A1    7/1991
WO         86/06515 A1    11/1986
(Continued)

*Primary Examiner* — Christopher M Koehler
(74) *Attorney, Agent, or Firm* — Craft Chu PLLC; Andrew W. Chu

(57) ABSTRACT

The device for adjusting the concentration of a gas in a liquid includes a cartridge in which the concentration of the gas in the liquid is adjusted, a pipe for supplying the liquid into the cartridge, a pipe for supplying gas into the cartridge, and a pipe for discharging the liquid from the cartridge. The gas supply pipe includes an expansion valve with of which the pressure setpoint that is controlled by a setpoint for the quantity amount of gas in the liquid and by an amount of a quantity of gas in the liquid measured by a gas concentration sensor located in the liquid discharge pipe.

8 Claims, 1 Drawing Sheet

(51) Int. Cl.
   *B01F 3/04* (2006.01)
   *G05D 21/02* (2006.01)
   *B01F 5/04* (2006.01)

(52) U.S. Cl.
   CPC .... *B01F 15/00344* (2013.01); *B01F 15/0412* (2013.01); *G05D 21/02* (2013.01); *B01F 2215/007* (2013.01)

(58) Field of Classification Search
   CPC .............. B01F 15/022; B01F 15/00292; B01F 15/00207; B01F 15/0412; B01F 15/0408; B01F 15/0429; B01F 2215/0072; B01F 2215/007
   USPC ........................................................ 99/323.1
   See application file for complete search history.

(56) References Cited

U.S. PATENT DOCUMENTS

2016/0175785 A1* 6/2016 Li ........................... A47J 31/00
                                                  366/163.2
2019/0262784 A1* 8/2019 Nakagawa .......... B01F 3/04503

FOREIGN PATENT DOCUMENTS

WO    2009/143056 A1    11/2009
WO    2013/144598 A1    10/2013

* cited by examiner

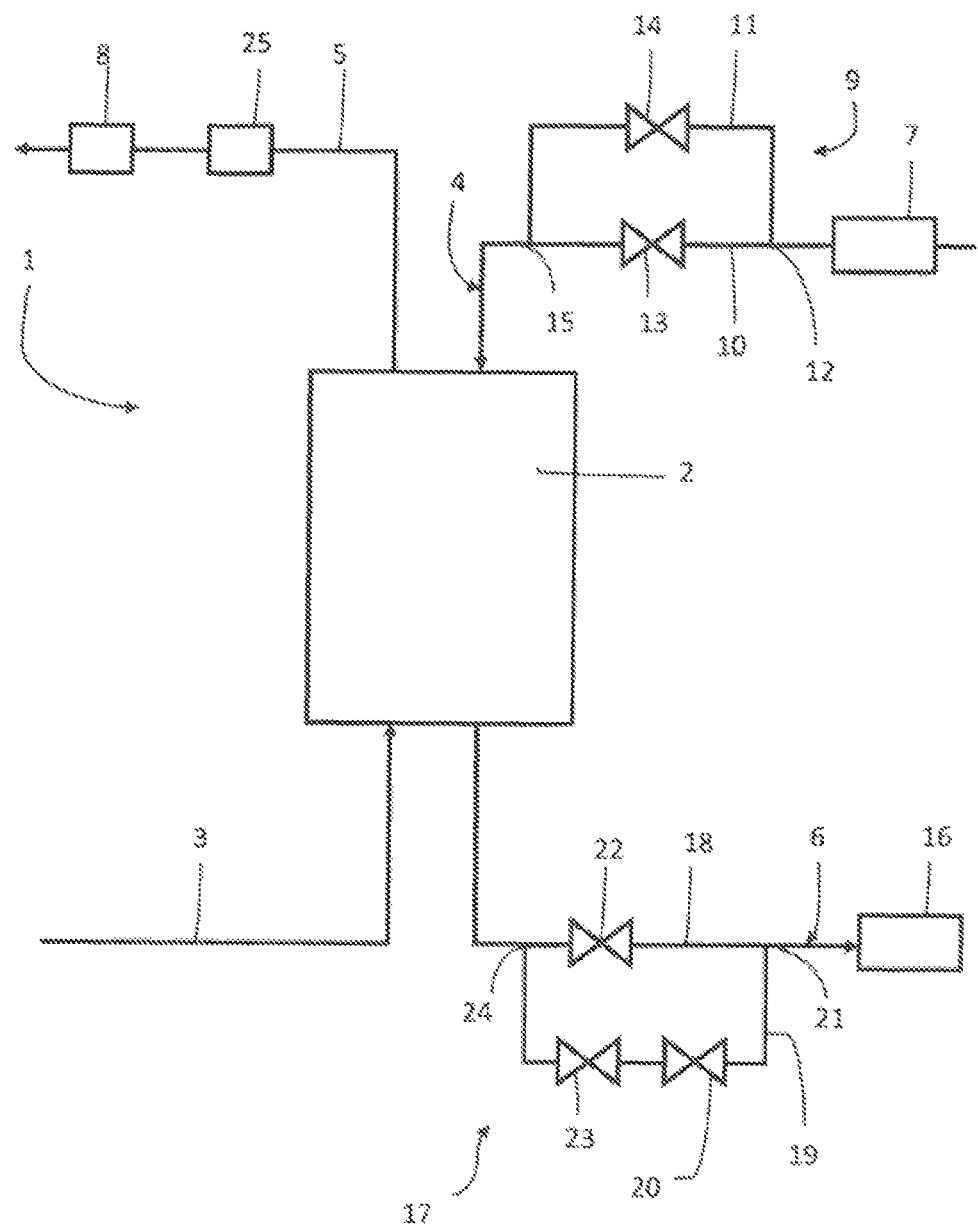

DEVICE FOR ADJUSTING THE
CONCENTRATION OF GAS IN A LIQUID

CROSS-REFERENCE TO RELATED
APPLICATIONS

See Application Data Sheet.

STATEMENT REGARDING FEDERALLY
SPONSORED RESEARCH OR DEVELOPMENT

Not applicable.

THE NAMES OF PARTIES TO A JOINT
RESEARCH AGREEMENT

Not applicable.

INCORPORATION-BY-REFERENCE OF
MATERIAL SUBMITTED ON A COMPACT
DISC OR AS A TEXT FILE VIA THE OFFICE
ELECTRONIC FILING SYSTEM (EFS-WEB)

Not applicable.

STATEMENT REGARDING PRIOR
DISCLOSURES BY THE INVENTOR OR A
JOINT INVENTOR

Not applicable.

BACKGROUND OF THE INVENTION

1. Field of the Invention

The invention relates to a device for adjusting the concentration of a gas in a liquid, and namely the concentration of carbon dioxide in wine.

2. Description of Related Art Including Information Disclosed Under 37 CFR 1.97 and 37 CFR 1.98

The prior art knows a device for adjusting the concentration of a gas in a liquid, which comprises a cartridge in which occurs the change in concentration of the gas in the liquid (typically, a cartridge based on porous hydrophobic walls, which do not permit the passage of the gases into the liquid or out of the latter), a liquid supply pipe into the cartridge, a gas supply pipe into the cartridge, and a liquid discharge pipe out of the cartridge. In the prior art, the gas supply pipe comprises a gas adjusting valve the flow rate of which is controlled by a setpoint for the gas flow-rate. This device is namely used to adjust the concentration of carbon dioxide in wine.

BRIEF SUMMARY OF THE INVENTION

The aim of the present invention is to provide a device for adjusting the concentration of gas in a liquid the liquid gassing efficiency of which is significantly improved, the dissolution of the gas is optimized and the accuracy of the concentration is significantly improved.

The invention relates to a device for adjusting the concentration of gas in a liquid, the device comprising a cartridge in which occurs the change in gas concentration in the liquid, liquid supply pipe into the cartridge, gas supply pipe into the cartridge, and a liquid discharge pipe out of the cartridge, wherein the gas supply pipe comprises a pressure regulator the setpoint for the pressure of which is controlled by a setpoint for the amount of gas in the liquid and by an amount of gas in the liquid measured by a gas concentration sensor located in the liquid discharge pipe.

The amount of gas exchanging with the liquid in the cartridge (and therefore the flow rate of gas exchanging with the liquid) varies depending on the value of the pressure of the gas between the pressure regulator and the cartridge and the capability of the cartridge to allow the exchange of the gas molecules.

Having substituted, in the first place, the gas adjusting valve by a pressure regulator and, in the second place, adjusting the flow-rate of the gas adjusting valve by adjusting the pressure of the gas between the pressure regulator and the cartridge depending, on the one hand, on the setpoint for the amount of gas in the liquid and, on the other hand, on the amount of gas in the liquid measured in the liquid discharge pipe, has permitted to obtain an improvement in the accuracy of the adjustment of the concentration of the gas in the liquid. Thus, when the gas concentration sensor indicates a lack of gas, since the setpoint for the amount of gas in the liquid is constant, the setpoint for the pressure increases, which leads to an increase in addition of gas at the level of the cartridge, thus an increase in concentration of gas in the liquid, and, as a result, a decrease in lack of gas. Conversely, when the gas concentration sensor indicates an excess of gas, since the setpoint for the amount of gas in the liquid is constant, the setpoint for the pressure decreases, which results into a decrease in addition of gas at the level of the cartridge, thus into a decrease in concentration of gas in the liquid, and, as a result, a drop of the excess of gas. Thus, the concentration of gas in the liquid rapidly tends towards the setpoint for the amount of gas.

According to a first embodiment, the adjustment of the gas pressure between the pressure regulator and the cartridge is a PID adjustment.

According to a second embodiment, the setpoint for the amount of gas in the liquid is chosen by a user of the device. Preferably, in the case in which the liquid is wine and the gas is carbon dioxide, this setpoint for the amount is between 500 mg/l and 10 g/l.

According to a third embodiment, the gas supply pipe comprises, between the cartridge and the pressure regulator, a gas management system adapted to control, depending on the setpoint for the pressure and a setpoint for the path, the gas path followed by the gas to enter into the cartridge, the gas path being, when the setpoint for the pressure is higher than the setpoint for the path, a portion of the gas supply pipe, which has a first pressure loss, and, when the setpoint for the pressure is lower than the setpoint for the path, an auxiliary gas supply pipe, which is parallel to the portion of the gas supply pipe and which has a second pressure loss higher than the first pressure loss, the setpoint for the path depending on the difference between the first and second pressure losses.

According to a first variant of the third embodiment, at least one of the two pressure losses of the portion of the gas supply pipe and the auxiliary gas supply pipe is fixed.

According to a second variant of the third embodiment, the first and second pressure losses are fixed. Advantageously, the setpoint for the path is equal to the difference between the first and second pressure losses.

According to a fourth embodiment, the adjusting device comprises a vacuum pipe extracting from the cartridge at least one gas extracted from the liquid. The gas introduced through the gas supply pipe may be part of the gases extracted from the cartridge by the vacuum pipe.

According to a first variant of the fourth embodiment, the adjustment of the extraction of the gases from the liquid is a PID adjustment.

According to a second variant of the fourth embodiment, the vacuum pipe comprises, between the cartridge and a vacuum pump, a vacuum management system adapted to direct, depending on whether gas is added or not into the liquid by the gas supply pipe, the path followed by the vacuum, which, in the absence of addition of gas in the liquid, is a portion of the vacuum pipe, which comprises no vacuum adjusting organ, and, when gas is added to the liquid, an auxiliary vacuum pipe, which is parallel to the portion of the vacuum pipe and which comprises an adjusting valve.

Preferably, the extraction of the gases by the vacuum is controlled by a setpoint for the vacuum, which, when the vacuum passes through the portion of the vacuum pipe, controls the vacuum pump, and when the vacuum passes through the auxiliary vacuum pipe, controls the adjusting valve.

Advantageously, when the vacuum passes through the portion of the vacuum pipe (and thus when there is no addition of gas into the liquid), the setpoint for the vacuum is determined depending on the setpoint for the amount of a gas in the liquid and the amount of this gas in the liquid measured by a concentration sensor of this gas, which is located in the liquid discharge pipe. Preferably, namely in the case in which the liquid is wine, the gas used for determining the setpoint for the vacuum when the latter passes through the vacuum pipe portion is carbon dioxide.

Advantageously, when the vacuum passes through the auxiliary vacuum pipe (and thus when there is an addition of gas—carbon dioxide—in the liquid—in the wine), the setpoint for the vacuum is determined depending on the setpoint for the amount of a gas in the liquid and the amount of this gas in the liquid measured by a concentration sensor of this gas, which is located in the liquid discharge pipe. Preferably, namely in the case in which the liquid is wine, the gas used for determining the setpoint for the vacuum when the latter passes through the vacuum pipe is dioxygen.

BRIEF DESCRIPTION OF THE SEVERAL VIEWS OF THE DRAWINGS

Other peculiarities and advantages of the present invention will become evident from the description of an embodiment given by way of a non-restrictive example and shown in the attached single drawing.

The FIGURE is a schematic view of the present invention.

DETAILED DESCRIPTION OF THE INVENTION

The invention relates to an adjusting device 1 adapted to adjust the concentration of a gas in a liquid. This adjusting device 1 is particularly suitable for adjusting the concentration of carbon dioxide in wine.

The adjusting device 1 comprises a cartridge 2 in which occurs the change in concentration of the gas (here, carbon dioxide) in the liquid (here, wine), a liquid supply pipe 3 adapted to supply the liquid (here, the wine) into the cartridge 2, a gas supply pipe 4 adapted to supply the gas (here, carbon dioxide) into the cartridge 2, a liquid discharge pipe 5 adapted to discharge the liquid (here, the wine) from the cartridge 2, and a vacuum pipe 6 adapted to extract from the cartridge 2 the gases extracted from the liquid (here, gases extracted from the wine).

The cartridge 2 is formed of hydrophobic porous walls, which only allow the passage of gases into or from the liquid. It is dimensioned for particularly important flowrates of liquid (among which, wine). Here, the circulation of the gases and the liquid occurs in opposite directions (it could be in the same direction).

According to the invention, the gas supply pipe 4 comprises a pressure regulator 7 the setpoint for the pressure of which is controlled by a setpoint for the amount of gas (here, carbon dioxide) in the liquid (here, the wine) and by an amount of gas (here, carbon dioxide) in the liquid (here, the wine) measured by a gas concentration sensor 8 (a carbon dioxide concentration sensor 8) located in the liquid discharge pipe 5.

The setpoint for the pressure permits to adjust the pressure of the gas (here, carbon dioxide) between the pressure regulator 7 and the cartridge 2. Here, this adjustment is a PID adjustment.

The setpoint for the amount of gas (here, carbon dioxide) in the liquid (here, the wine) is fixed and chosen by a user of the adjusting device 1.

Preferably, the setpoint for the amount of carbon dioxide in the wine is between 500 mg/l and 10 g/l. A setpoint of about 500 mg/l corresponds to red wine, and a setpoint of about 10 g/l corresponds to sparkling wine such as champagne. The setpoint for the amount of gas in the liquid, even in the case in which the gas is carbon dioxide and the liquid is wine, may be less than 500 mg/l.

The gas supply pipe 4 comprises, between the cartridge 2 and the pressure regulator 7, a gas management system 9. The gas management system 9 permits to control, depending on the setpoint for the pressure and a setpoint for the path, the path followed by the gas (here, carbon dioxide) to flow into the cartridge 2. When the setpoint for the pressure is higher than the setpoint for the path, the path followed by the gas (here, carbon dioxide) is a portion 10 of the gas supply pipe 4, this portion 10 having a first pressure loss (preferably, the portion 10 of the gas supply pipe 4 is the only path followed by the gas (here, carbon dioxide) when the setpoint for the pressure is higher than the setpoint for the path). On the contrary, when the setpoint for the pressure is lower than the setpoint for the path, the path followed by the gas (here, the carbon dioxide) is an auxiliary gas supply pipe 11, which is parallel to the portion 10 of the gas supply pipe 4 and which has a second pressure loss higher than the first pressure loss (preferably, the auxiliary gas supply pipe 11 is the only path followed by the gas (here, carbon dioxide) when the setpoint for the pressure is lower than the setpoint for the path). The setpoint for the path depends on the difference between the first and second pressure losses. Thus, for the same setpoint for the pressure imposed on the pressure regulator 7, it is possible to introduce two different quantities of gas (here, carbon dioxide) into the liquid (here, the wine) according to the path followed by this gas (here, by carbon dioxide).

In the present embodiment, the gas management system 9 comprises, on the one hand, a T-shaped upstream junction 12, which connects the pressure regulator 7, the portion 10 of the gas supply pipe 4 and the auxiliary gas supply pipe 11, on a second hand, a first upstream valve 13 arranged in the portion 10 of the gas supply pipe 4, and, on a third hand, a second upstream valve 14 arranged in the auxiliary gas supply pipe 11.

The gas supply pipe 4 also comprises, downstream of the gas management system 9, a complementary upstream T-shaped junction 15 permitting the auxiliary gas supply pipe 11 to be joined to the portion 10 of the gas supply pipe 4.

In the present embodiment, the first pressure loss is fixed. Yet in the present embodiment, the second pressure loss is fixed. Since the first and second pressure losses are fixed, the difference between these two pressure losses is fixed and, hence, the setpoint for the path, which is substantially equal to this difference, is also fixed. Here, the value of the setpoint for the path is about 2 g/l. Thus, the higher the value of the second pressure loss, the more the adjusting device 1 permits to accurately introduce small amounts of gas (here, carbon dioxide) into the liquid (here, the wine).

It would be possible to have a greater number of paths for carrying the gas (here, carbon dioxide) from the pressure regulator 7 into the cartridge 2.

The extraction of the gases from the liquid (here, wine) is performed by a vacuum pump 16 arranged in the vacuum pipe 6. This extraction is controlled by a setpoint for the vacuum. In the present embodiment, since the adjusting device 1 does not comprise any organ permitting to sort the types of gas extracted from the liquid (here, wine), the vacuum simultaneously extracts different gases from the liquid (here, wine). In the case of wine, the extraction mainly relates to carbon dioxide and dioxygen.

In the present example, the adjustment of the extraction of the gases from the liquid (here, from the wine) is a PID adjustment.

The vacuum pipe 6 comprises, between the cartridge 2 and the vacuum pump 16, a vacuum management system 17, which is adapted to direct the path followed by the vacuum (and thus the gases extracted from the liquid to flow from the cartridge 2 to the vacuum pump 16) depending on whether gas (here, carbon dioxide) is added or not to the liquid (here, the wine) by the gas supply pipe 4. In the absence of addition of gas (here, carbon dioxide) in the liquid (here, the wine), the path followed by the vacuum (and thus the gases extracted from the liquid—here, the wine) is a portion 18 of the pipe of vacuum 6, the portion 18 comprising no vacuum adjusting organ (preferably, the portion 18 of the vacuum pipe 6 is the only path followed by the vacuum in the absence of addition of gas—here, carbon dioxide—to the liquid—here, the wine). On the contrary, when gas (here, carbon dioxide) has been added to the liquid (here, wine), the path followed by the vacuum (and thus the gases extracted from the liquid—here, the wine) is an auxiliary vacuum pipe 19, which is parallel to the portion 18 of the vacuum pipe 6 and which comprises an adjusting valve 20 permitting to adjust the vacuum (preferably, the auxiliary vacuum pipe 19 is the only path followed by the vacuum when gas—here, carbon dioxide—is added to the liquid—here the wine).

In the present embodiment, the vacuum management system 17 comprises, on the one hand, a T-shaped downstream junction 21, which connects the vacuum pump 16, the portion 18 of the vacuum pipe 6 and the auxiliary vacuum pipe 19, on a second hand, a first downstream valve 22 arranged in the portion 18 of the vacuum pipe 6, and, on a third hand, a second downstream valve 23 arranged in the auxiliary vacuum pipe 19.

The vacuum pipe also comprises, between the cartridge 2 and the vacuum management system 17, a complementary T-shaped downstream junction 24 permitting the auxiliary vacuum pipe 19 to be joined to the portion 18 of the vacuum pipe 6.

Preferably, when the vacuum passes through the portion 18 of the vacuum pipe 6 (when no gas has been added to the liquid), the setpoint for the vacuum controls the vacuum pump 16 (here, the speed of the vacuum pump 16). Also preferably, when the vacuum passes through the vacuum pipe 19 (when gas has been added to the liquid), the setpoint for the vacuum controls the vacuum adjusting valve 20 (here, the opening of the adjusting valve 20) and, advantageously, the vacuum pump 16 is controlled to operate at a predetermined fixed speed, which is independent from the setpoint for the vacuum.

Advantageously, when the vacuum passes through the portion 18 of the vacuum pipe 6 (when no gas has been added to the liquid), the setpoint for the vacuum is determined depending on the setpoint for the amount of a gas in the liquid (here, the wine) and the amount of this gas in the liquid (here, the wine) measured by a concentration sensor of this gas 8, 25, which is located in the liquid discharge pipe 5. In the present embodiment, in which the liquid is wine, the user of the adjusting device will a priori choose to control the carbon dioxide. Therefore, the setpoint for the vacuum is determined by the setpoint for the amount of carbon dioxide in the wine (previously determined by the user) and by the amount of carbon dioxide in the wine measured by the carbon dioxide concentration sensor 8. In the case in which the gas to be controlled would be oxygen, the setpoint for the vacuum would be determined by a setpoint for the amount of dioxygen in the wine (determined by the user) and by the amount of dioxygen in the liquid measured by an oxygen concentration sensor 25 arranged in the liquid discharge pipe 5.

Advantageously, when the vacuum passes through the vacuum pipe 19 (when gas has been added into the liquid), the setpoint for the vacuum is determined depending on the setpoint for the amount of a gas in the liquid (here, the wine) and the amount of this gas in the liquid (here, the wine) measured by a concentration sensor of this gas 25, which is located in the liquid discharge pipe 5. In the present embodiment, in which the liquid is wine, since the concentration of carbon dioxide is controlled through the gas supply pipe 4, the user of the adjusting device will a priori choose to control the dioxygen. Therefore, the setpoint for the vacuum is determined by the setpoint for the amount of dioxygen in the wine (determined by the user) and by the amount of dioxygen in the wine measured by the dioxygen concentration sensor 25. Preferably, the setpoint for the amount of dioxygen in the wine is less than 1 mg/l, and preferably less than 0.5 mg/l. In the case in which the adjusting device 1 cannot meet both the setpoint for the amounts of carbon dioxide and dioxygen in the wine, it is configured to meet, by priority, the setpoint for the amount of carbon dioxide, the adjusting valve 20 being controlled accordingly.

The present adjusting device 1 permits to adjust the concentrations of two gases (here, the carbon dioxide and the dioxygen) in a liquid (here, the wine) by performing only one passing through the cartridge 2. It also permits to adjust these concentrations without consuming dinitrogen.

The use of the adjusting device 1 can be summarized as follows.

In a first step, a user causes the liquid (here, the wine) to circulate in the adjusting device 1 after having indicated to an automaton of the adjusting device 1 a setpoint for the amount of a first gas in the liquid (here, a setpoint for the amount of carbon dioxide in the wine) and eventually a setpoint for the amount of a second gas in the liquid (here, a setpoint for the amount of dioxygen in the wine).

The adjustment of the concentration of the first gas is performed by comparing the amount of the first gas (here, carbon dioxide) in the liquid (here, the wine) measured by the concentration sensor of the first gas 8 (here, the carbon dioxide concentration sensor 8) with the setpoint for the amount of the first gas (here, the carbon dioxide) in the liquid (here, the wine). This comparison, made by the automaton, permits to determine the setpoint for the pressure of the pressure regulator 7 and the setpoint for the vacuum.

If the amount of the first gas (here, the carbon dioxide) in the liquid (here, wine) is less than the setpoint for the amount of the first gas (here, the carbon dioxide) in the liquid (here, the wine), the setpoint for the pressure of the pressure regulator 7 is equal to zero, which results into no first gas being introduced into the liquid (there is no addition of carbon dioxide into the wine). As a result, the adjustment of the concentration of the first gas (here, the carbon dioxide) in the liquid (here, the wine) is performed by the setpoint for the vacuum, which controls the vacuum pump 16 so as to extract the gases, among which the carbon dioxide, from the liquid (here, wine). The adjustment of the vacuum pump 16 results into a decrease in the amount of the first gas (here, the carbon dioxide) in the liquid (here, the wine) until it reaches the value of the setpoint for the amount of the first gas (here, the carbon dioxide) in the liquid (here, the wine).

If the amount of the first gas (here, the carbon dioxide) in the liquid (here, the wine) is higher than the setpoint for the amount of the first gas (here, the carbon dioxide) in the liquid (here, the wine), the setpoint for the pressure of the pressure regulator 7 is higher than zero, which results into an amount of the first gas (here, carbon dioxide) being introduced into the liquid (here, the wine). The adjustment of the pressure regulator 7 causes an increase in the amount of the first gas (here, the carbon dioxide) in the liquid (here, the wine) until it reaches the value of the setpoint for the amount of the first gas (here, the carbon dioxide) in the liquid (here, the wine).

In the case in which the first gas (here, the carbon dioxide) is introduced into the liquid (here, the wine), if the user has indicated to the automaton a setpoint for the amount of a second gas in the liquid (here, a setpoint for the amount of dioxygen in the wine) and the amount of this second gas in the liquid is lower than this setpoint, the adjustment of the concentration of the second gas (here, dioxygen) in the liquid (here, the yin) is performed by the setpoint for the vacuum, which controls the adjusting valve 20 so as not to extract gas (among which the carbon dioxide and the dioxygen) from the liquid (here, the wine).

Yet in the case in which the first gas (here, the carbon dioxide) is introduced into the liquid (here, the wine), if the user has indicated to the automaton a setpoint for the amount of a second gas in the liquid (here, a setpoint for the amount of dioxygen in the wine) and the amount of this second gas in the liquid is higher than this setpoint, the adjustment of the concentration of the second gas (here, dioxygen) in the liquid (here, the wine) is performed by the setpoint for the vacuum, which controls the adjusting valve 20 so as to extract the gases, among which the carbon dioxide and the dioxygen, from the liquid (here, wine). The adjustment of the adjusting valve 20 causes a decrease in the amounts of the first and second gases (here, carbon dioxide and dioxygen) in the liquid (here, the wine). Because of the decrease of the amount of the second gas (here, the dioxygen) in the liquid (here, the wine), the value of the setpoint for the vacuum decreases until the amount of the second gas (here, the dioxygen) in the liquid (here, the wine) reaches the value of the setpoint for the amount of the second gas in the liquid (here, the setpoint for the amount of dioxygen in the wine). On the one hand, because the setpoint for the amount of the first gas in the liquid (here, the amount of carbon dioxide in the wine) is fixed, and, on the other hand, because the amount of the first gas (here, the carbon dioxide) in the liquid (here, the wine) diminishes, the setpoint for the pressure of the pressure regulator 7 increases and, hence, the addition of the first gas (here, the carbon dioxide) into the liquid (here, the wine) increases. The adjustment of the pressure regulator 7 causes an increase of the amount of the first gas (here, the carbon dioxide) in the liquid (here, the wine) until it reaches the value of the setpoint for the amount of the first gas (here, the carbon dioxide) in the liquid (here, the wine). The concentration of the first gas (here, the carbon dioxide) is the result of the adjustment of the pressure regulator 7 and the adjusting valve 20. The concentration of the second gas (here, the dioxygen) is the result of the adjustment of the adjusting valve 20. In the case in which the adjusting device 1 cannot meet the setpoint for the amount of the first gas in the liquid (here, the setpoint for the amount of carbon dioxide in the wine) and the setpoint for the amount of the second gas in the liquid (here, the setpoint for the amount of dioxygen in the wine), the automaton controls the pressure regulator 7 and the adjusting valve 20 in order to meet, by priority, the setpoint for the amount of the first gas in the liquid (here, the setpoint for the amount of carbon dioxide in the wine).

The invention claimed is:

1. A device for adjusting concentration of a gas in a liquid, said device comprising:
   a cartridge in which occurs the change in concentration of the gas in the liquid,
   a liquid supply pipe into the cartridge,
   a gas supply pipe into the cartridge,
   a liquid discharge pipe out of the cartridge, and
   a vacuum pipe extracting from the cartridge at least one gas extracted from the liquid,
   wherein the gas supply pipe comprises a pressure regulator having a setpoint for the pressure controlled by a setpoint for amount of gas in the liquid and by an amount of gas in the liquid measured by a gas concentration sensor located in the liquid discharge pipe, and
   wherein the vacuum pipe comprises a vacuum pump and a vacuum management system between the cartridge and the vacuum pump so as to direct, depending on whether gas is added or not into the liquid by the gas supply pipe, the path through the vacuum pipe followed by the vacuum, being comprised of, in the absence of addition of gas into the liquid, a portion of the vacuum pipe, and, when gas is added into the liquid, an auxiliary vacuum pipe, which is parallel to said portion of the vacuum pipe, said portion having a first downstream valve between the cartridge and said vacuum pump and no vacuum adjusting organ, said auxiliary vacuum pipe having a second downstream valve between the cartridge and said vacuum pump and a vacuum adjusting valve between said second downstream valve and said vacuum pump.

2. The device for adjusting according to claim 1, wherein the gas supply pipe comprises, between the cartridge and the pressure regulator, a gas management system adapted to control, depending on the setpoint for the pressure and a setpoint for the path, the gas path followed by the gas to enter into the cartridge, the gas path being, when the setpoint for the pressure is higher than the setpoint for the path, a portion of the gas supply pipe, which has a first pressure loss, and, when the setpoint for the pressure is lower than the setpoint for the path, an auxiliary gas supply pipe, which is parallel to the portion of the gas supply pipe and which has a second pressure loss higher than the first pressure loss, the setpoint for the path depending on the difference between the first and second pressure losses.

3. The device for adjusting according to claim 2, wherein the first and second pressure losses are fixed.

4. The device for adjusting according to claim 3, wherein the setpoint for the path is equal to the difference between the first and second pressure losses.

5. The device for adjusting according to claim 1, wherein the gas extraction by the vacuum is controlled by a setpoint for the vacuum, which, when the vacuum passes through the portion of the vacuum pipe, controls the vacuum pump and, when the vacuum passes through the auxiliary vacuum pipe, controls the adjusting valve.

6. The device for adjusting according to claim 5, wherein, when the vacuum passes through the portion of the vacuum pipe, the setpoint for the vacuum is determined according to the setpoint for the amount of a gas in the liquid and the amount of this gas in the liquid measured by a concentration sensor of this gas, which is located in the liquid discharge pipe.

7. The device for adjusting according to claim 5, wherein, when the vacuum passes through the vacuum pipe, the setpoint for the vacuum is determined depending on the setpoint for the amount of a gas in the liquid and the amount of this gas in the liquid measured by a concentration sensor of this gas, which is located in the liquid discharge pipe.

8. The device for adjusting according to claim 7, wherein, when it cannot meet both the setpoint for the amount of a first gas in the liquid, which is introduced into the cartridge by the gas supply pipe and which is extracted from the cartridge by the vacuum pipe, and the setpoint for the amount of a second gas in the liquid, which is extracted from the cartridge by the vacuum pipe, the adjusting device is configured to meet, by priority, the setpoint for the amount of the first gas in the liquid.

* * * * *